(12) United States Patent
Krishnakumar et al.

(10) Patent No.: US 10,261,748 B2
(45) Date of Patent: Apr. 16, 2019

(54) TECHNOLOGIES FOR PROTECTING AUDIO DATA WITH TRUSTED I/O

(71) Applicant: Intel Corporation, Santa Clara, CA (US)

(72) Inventors: Sudha Krishnakumar, Portland, OR (US); Reshma Lal, Hillsboro, OR (US); Pradeep M. Pappachan, Hillsboro, OR (US); Kar Leong Wong, Bayan Lepas (MY); Steven B. McGowan, Portland, OR (US); Adeel A. Aslam, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 14/974,645

(22) Filed: Dec. 18, 2015

(65) Prior Publication Data

US 2017/0177293 A1    Jun. 22, 2017

(51) Int. Cl.
*G06F 17/00* (2006.01)
*G06F 3/16* (2006.01)
(Continued)

(52) U.S. Cl.
CPC ............ *G06F 3/165* (2013.01); *G06F 15/167* (2013.01); *H04L 9/32* (2013.01); *H04L 63/126* (2013.01);
(Continued)

(58) Field of Classification Search
CPC ..... G06F 15/167; G06F 3/165; H04L 63/126; H04L 65/1069; H04L 65/4069; H04L 67/146; H04L 9/32
(Continued)

(56) References Cited

U.S. PATENT DOCUMENTS

| 8,705,729 B2 * | 4/2014 | Wong ................... H04L 9/0822 380/28 |
| 2006/0259431 A1 * | 11/2006 | Poisner ................. G06F 21/126 705/51 |

(Continued)

FOREIGN PATENT DOCUMENTS

| EP | 2221742 | 8/2010 |
| WO | 03-083671 | 10/2003 |

OTHER PUBLICATIONS

Wang: Survey of IO Virtualization: 2010.*
(Continued)

*Primary Examiner* — Paul C McCord
(74) *Attorney, Agent, or Firm* — Barnes & Thornburg LLP

(57) ABSTRACT

Technologies for cryptographic protection of I/O audio data include a computing device with a cryptographic engine and an audio controller. A trusted software component may request an untrusted audio driver to establish an audio session with the audio controller that is associated with an audio codec. The trusted software component may verify that a stream identifier associated with the audio session received from the audio driver matches a stream identifier received from the codec. The trusted software may program the cryptographic engine with a DMA channel identifier associated with the codec, and the audio controller may assert the channel identifier in each DMA transaction associated with the audio session. The cryptographic engine cryptographically protects audio data associated with the audio session. The audio controller may lock the controller topology after establishing the audio session, to prevent re-routing of audio during a trusted audio session. Other embodiments are described and claimed.

18 Claims, 7 Drawing Sheets

(51) Int. Cl.
  *G06F 15/167* (2006.01)
  *H04L 9/32* (2006.01)
  *H04L 29/06* (2006.01)
  *H04L 29/08* (2006.01)
(52) U.S. Cl.
  CPC ...... *H04L 65/1069* (2013.01); *H04L 65/4069* (2013.01); *H04L 67/146* (2013.01)
(58) Field of Classification Search
  USPC .......................................................... 700/94
  See application file for complete search history.

(56) References Cited

U.S. PATENT DOCUMENTS

| | | | | |
|---|---|---|---|---|
| 2009/0287857 | A1* | 11/2009 | Vu | G06F 13/28 710/22 |
| 2011/0061050 | A1* | 3/2011 | Sahita | G06F 9/45533 718/1 |
| 2011/0314468 | A1 | 12/2011 | Zhou et al. | |
| 2012/0011351 | A1* | 1/2012 | Mundra | G06F 21/72 713/1 |
| 2013/0282227 | A1* | 10/2013 | Chen | G07C 5/008 701/31.5 |
| 2014/0068704 | A1* | 3/2014 | Grewal | H04L 63/0428 726/1 |
| 2014/0122820 | A1* | 5/2014 | Park | G06F 21/74 711/163 |
| 2014/0298014 | A1 | 10/2014 | Kramer et al. | |
| 2015/0058637 | A1* | 2/2015 | Raskin | G06F 21/602 713/189 |
| 2015/0178226 | A1* | 6/2015 | Scarlata | G06F 12/1466 711/163 |
| 2015/0282224 | A1 | 10/2015 | McRae et al. | |

OTHER PUBLICATIONS

Intel SGX manual: available at least Oct. 2014.*
International search report for PCT application No. PCT/US2016/062781, dated Feb. 27, 2017 (3 pages).
Written opinion for PCT application No. PCT/US2016/062781, dated Feb. 27, 2017 (4 pages).

* cited by examiner

US 10,261,748 B2

TECHNOLOGIES FOR PROTECTING AUDIO DATA WITH TRUSTED I/O

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory. The on-chip boundary forms a natural security boundary, where data and code may be stored in plaintext and assumed to be secure. Intel® SGX may not protect I/O data such as audio data that moves across the on-chip boundary.

Trusted I/O (TIO) technology enables an application to send and/or receive I/O data securely to/from a device, such as an audio controller. In addition to the hardware that produces or consumes the I/O data, several software and firmware components in the I/O pipeline might also process the data. Certain computing devices may include a central cryptographic engine capable of intercepting direct memory access (DMA) transactions to or from I/O controllers and providing cryptographic protection to the DMA payload.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
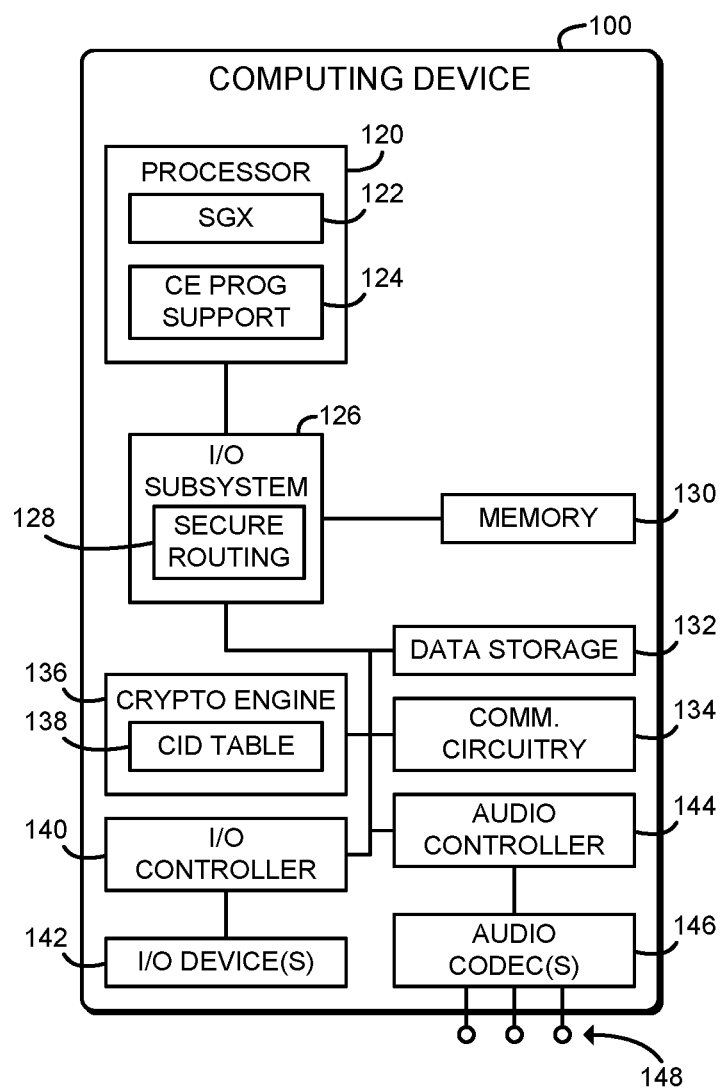
FIG. 1 is a simplified block diagram of at least one embodiment of a computing device for protecting I/O data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for protecting audio data with trusted I/O includes, among other components, a processor 120, a cryptographic engine 136, and an audio controller 144 in communication with one or more audio codecs 146. In use, as further described below, an audio driver of the computing device 100 sets up an audio session by configuring an audio pipeline between an audio stream buffer in memory and a particular codec 146 and/or audio device connected to the codec 146. Trusted software of the computing device 100, such as a secure enclave protected by the processor 120, verifies that the correct endpoint (e.g., audio codec 146) has been configured for the audio session. The trusted software commands the audio controller 144 to lock the controller topology, preventing further changes to the connections between the audio stream buffer and the audio codec 146. The audio session is started, and audio data begins to flow between the audio controller 144 and main memory of the computing device 100. The audio data is protected in transit by the cryptographic engine 136. Thus, the computing device 100 may protect the integrity of audio data, preventing audio data from being stolen, tampered with, and/or replayed by malicious software agents. The computing device 100 may also prevent malicious software such as a malicious audio driver from setting up an audio pipeline with the wrong input source. Additionally, the computing device 100 may prevent a malicious audio driver from changing audio routing at the codec level after an audio session is established.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 126, a memory 130, a data storage device 132, and communication circuitry 134. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 may include secure enclave support 122 and crypto engine programming support 124.

The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The crypto engine programming support 124 allows the processor 120 to program the cryptographic engine 136 to provide cryptographic protection of DMA I/O data. In particular, the processor 120 may enable or disable encryption for certain DMA I/O channels, and may securely provide encryption keys to the cryptographic engine 136. The crypto engine programming support 124 may be embodied as one or more specialized processor instructions and associated hardware, microcode, firmware, or other components of the processor 120. The crypto engine programming support 124 of the processor 120 may allow trusted software to program the cryptographic engine 136 while preventing untrusted software from programming the cryptographic engine 136.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. The memory 130 is communicatively coupled to the processor 120 via the I/O subsystem 126, which may be embodied as circuitry and/or components to facilitate input/output operations with the processor 120, the memory 130, and other components of the computing device 100. For example, the I/O subsystem 126 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. The I/O subsystem 126 may further include secure routing support 128. The secure routing support 128 includes hardware support to ensure I/O data cannot be misrouted in the fabric 126 under the influence of rogue software. The secure routing support 128 may be used with the cryptographic engine 136 to provide cryptographic protection of I/O data. In some embodiments, the I/O subsystem 126 may form a portion of a system-on-a-chip (SoC) and be incorporated, along with the processor 120, the memory 130, and other components of the computing device 100, on a single integrated circuit chip.

The data storage device 132 may be embodied as any type of device or devices configured for short-term or long-term storage of data such as, for example, memory devices and circuits, memory cards, hard disk drives, solid-state drives, or other data storage devices. In some embodiments, the data storage device 132 may be used to store the contents of one or more secure enclaves. When stored by the data storage device 132, the contents of the secure enclave may be encrypted to prevent unauthorized access.

The communication circuitry 134 of the computing device 100 may be embodied as any communication circuit, device, or collection thereof, capable of enabling communications between the computing device 100 and other remote devices over a network. The communication circuitry 134 may be configured to use any one or more communication technology (e.g., wired or wireless communications) and associated protocols (e.g., Ethernet, Bluetooth®, Wi-Fi®, WiMAX, etc.) to effect such communication.

The cryptographic engine 136 may be embodied as any microcontroller, microprocessor, functional block, logic, or other circuit or collection of circuits capable of performing the functions described herein. As further described below, the cryptographic engine 136 may encrypt and/or decrypt I/O data read or written by the I/O controllers 140 in one or more direct memory access (DMA) operations to the memory 130. The cryptographic engine 136 includes an internal channel identifier (CID) table 138, which the cryptographic engine 136 uses to dynamically identify DMA channel(s) to be protected. The CID table 138 may be controlled and/or programmed by trusted software, for example using the crypto engine programming support 124 of the processor 120. The encryption keys and/or other secret information of the CID table 138 are not available to untrusted software. In some embodiments, the cryptographic engine 136 may be incorporated along with the I/O subsystem 126 and/or the processor 120 in a system-on-a-chip (SoC) of the computing device 100. Additionally, although illustrated as a hardware cryptographic engine, it should be understood that in some embodiments the cryptographic engine 136 may be embodied as any secure computational component of the computing device 100, including any combination of hardware, firmware, processor microcode, and/or software of the computing device 100.

Similarly, the I/O controllers 140 may be embodied as any embedded controller, microcontroller, microprocessor, functional block, logic, or other circuit or collection of circuits capable of performing the functions described herein. In some embodiments, one or more of the I/O controllers 140 may be embedded in another component of the computing device 100 such as the I/O subsystem 126 and/or the processor 120. Additionally or alternatively, one or more of the I/O controllers 140 may be connected to the I/O subsystem 126 and/or the processor 120 via an expansion bus such as PCI Express (PCIe) or other I/O connection. In use, the I/O controllers 140 communicate with one or more I/O devices 142, for example over a peripheral communications bus (e.g., USB, Bluetooth, etc.). The I/O devices 142 may be embodied as any I/O device, such as human interface devices, keyboards, mice, touch screens, microphones, cameras, and other input devices, as well as speakers, displays, and other output devices. As described above, the I/O controllers 140 and associated DMA channels are uniquely identified using identifiers called channel identifiers (CIDs). Each I/O controller 140 may assert an appropriate CID with every DMA transaction, for example as part of a transaction layer packet (TLP) prefix, to uniquely identify the source of the DMA transaction and provide liveness protections. The CID also enables the isolation of I/O from different devices 142.

As shown, the computing device 100 further includes an audio controller 144. The audio controller 144 is a specialized I/O controller 140 configured to process audio data for input and/or output. For example, the audio controller 144 may be embodied as a host controller that implements the Intel® High Definition Audio specification or otherwise provides for input and/or output of digital audio data. The audio controller 144 includes or is otherwise connected to one or more audio codecs 146. Each audio codec 146 may be embodied as a controller, functional block, or other hardware resource capable of inputting or outputting audio data to particular audio devices. Thus, each audio codec 146 may include one or more digital-to-analog (DAC), analog-to-digital (ADC) converters, amplifiers, and/or other hardware audio resources. Each audio codec 146 may be connected to one or more audio devices 148, which may include audio output devices (e.g., speakers or headphones), audio input devices (e.g., microphones), audio jacks, or other audio devices.

Figure 2:
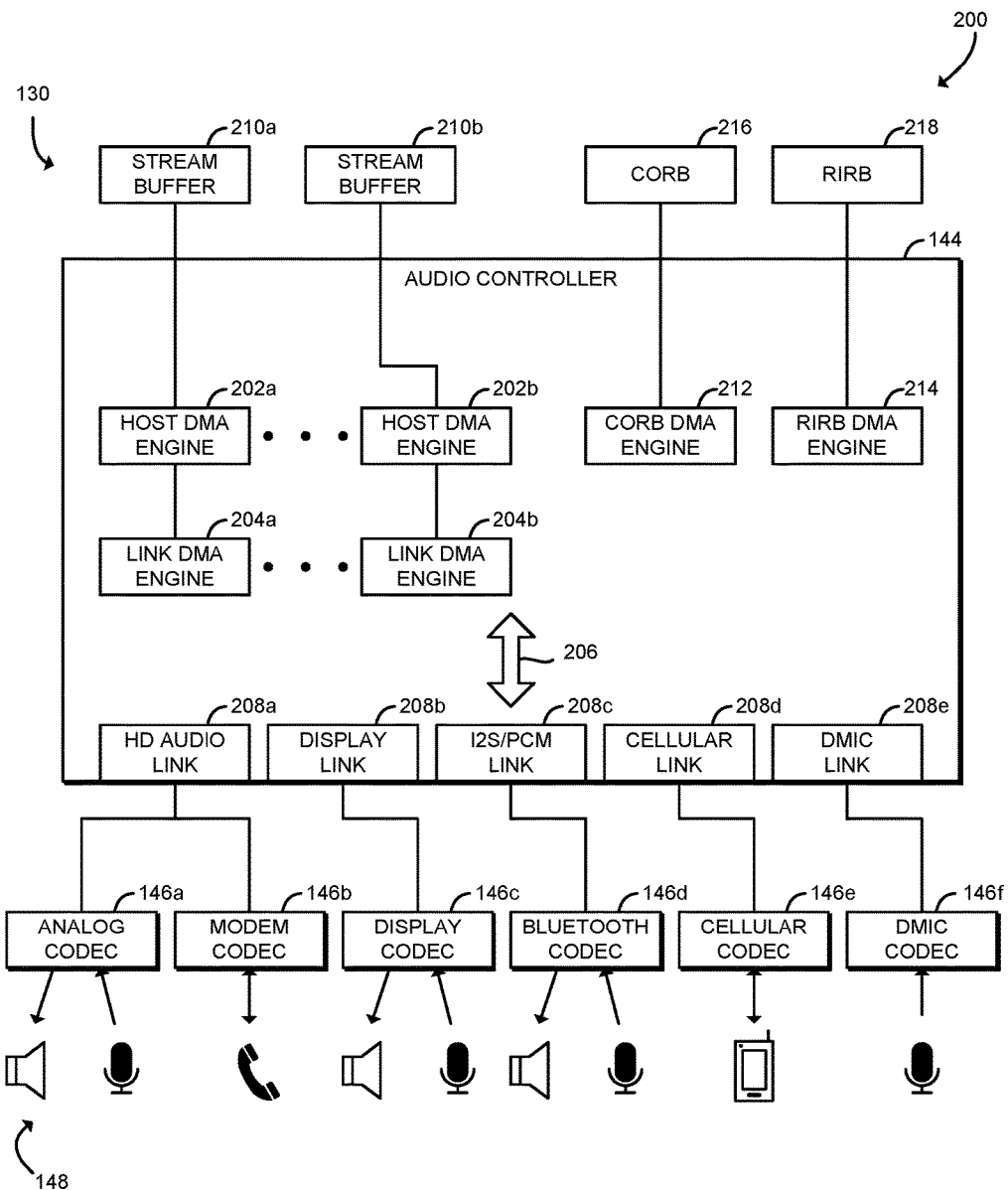
FIG. 2 is a simplified block diagram of an audio controller of the computing device of FIG. 1.

Referring now to FIG. 2, diagram 200 illustrates one potential embodiment of the audio controller 144. As shown, the illustrative audio controller 144 includes several host DMA engines 202 and link DMA engines 204. The link DMA engines 204 are connected through a link layer 206 to several audio links 208. Each of the audio links 208 may be connected to one or more codecs 146. In use, each of the host DMA engines 202 may be in communication with a stream buffer 210, which may be embodied as one or more ring buffers allocated in the system memory 130. Each stream buffer 210 may store audio data for an audio stream. The audio data may be input from the audio controller 144 and/or output to the audio controller 144. To set up an audio session, an audio pipeline is established between a stream buffer 210, a host DMA engine 202, a corresponding link DMA engine 204, an audio link 208, and a codec 146. After the audio session is set up, the DMA engines 202, 204 may generate DMA transactions to transfer audio data between the stream buffer 210 and the connected codec 146. The various links between DMA engines 202, 204, audio links 208, and codecs 146 thus establish a topology for audio streams processed by the audio controller 144.

As shown, the illustrative audio controller 144 further includes a command output ring buffer (CORB) DMA engine 212 and a response input ring buffer (RIRB) DMA engine 214. The CORB DMA engine 212 communicates with a command output ring buffer (CORB) 216 established in the memory 130, and the RIRB DMA engine 214 communicates with a response input ring buffer (RIRB) 218 established in the memory 130. The CORB 216 and the RIRB 218 may be used by software of the computing device 100, such as untrusted driver software, to configure the audio controller 144 and/or the audio codecs 146. In particular, an untrusted audio driver may store commands in the CORB 216 that may be passed by the CORB DMA engine 212 to one or more of the codecs 146. The commands may, among other things, configure the controller topology of the audio controller 144, including the routing of audio streams between the DMA engines 202, 204 and the audio codecs 146. Responses generated by the codecs 146 may be passed by the RIRB DMA engine 214 to the RIRB 218.

As shown, the illustrative audio controller 144 is connected to multiple codecs 146, and each codec 146 may be connected to multiple input and/or output audio devices 148. For example, an analog codec 146a may be connected to analog speakers or a microphone, a modem codec 146b may be connected to a landline modem, a display codec 146c may be connected to a monitor with audio capabilities, a Bluetooth codec 146d may be connected to a Bluetooth headset, a cellular codec 146e may be connected to a cellular modem, and a digital microphone (DMIC) codec 146f may be connected to a DMIC array. Each codec 146 may be connected to a particular audio link 208 of the audio controller 144. For example, the analog codec 146a and the modem codec 146b may be connected to an HD audio link 208a, the display codec 146c may be connected to a display link 208b, the Bluetooth codec 146d may be connected to an I²S/PCM link 208c, the cellular codec 146e may be connected to a cellular link 208d, and the DMIC codec 146f may be connected to the DMIC link 208e. It should be understood that in other embodiments, the audio controller 144 may include a different number and/or arrangement of DMA engines 202, 204, audio links 208, and/or codecs 146.

Figure 3:
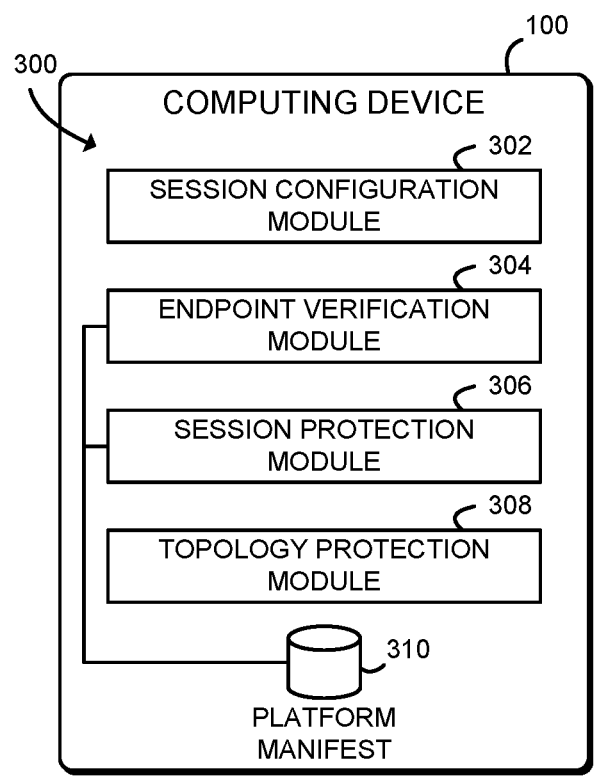
FIG. 3 is a simplified block diagram of at least one embodiment of an environment that may be established by the computing device of FIGS. 1-2.

Referring now to FIG. 3, in an illustrative embodiment, the computing device 100 establishes an environment 300 during operation. The illustrative environment 300 includes a session configuration module 302, an endpoint verification module 304, a session protection module 306, and a topology protection module 308. The various modules of the environment 300 may be embodied as hardware, firmware, software, or a combination thereof. As such, in some embodiments, one or more of the modules of the environment 300 may be embodied as circuitry or collection of electrical devices (e.g., session configuration circuitry 302, endpoint verification circuitry 304, session protection circuitry 306, and/or topology protection circuitry 308). It should be appreciated that, in such embodiments, one or more of the session configuration circuitry 302, the endpoint verification circuitry 304, the session protection circuitry 306, and/or the topology protection circuitry 308 may form a portion of one or more of the processor 120, the I/O subsystem 126, the cryptographic engine 136, the audio controller 144, and/or other components of the computing device 100. Additionally, in some embodiments, one or more of the illustrative modules may form a portion of another module and/or one or more of the illustrative modules may be independent of one another.

The session configuration module 302 is configured to request, by a trusted software component of the computing device 100, an untrusted audio driver of the computing device 100 to establish an audio session with an audio controller 144. The session configuration module 302 is further configured to receive, by the trusted software component, a stream identifier associated with the audio session from the untrusted audio driver. The audio session is associated with an audio codec 146 of the audio controller 144. The trusted software component may be embodied as a secure enclave established with the secure enclave support 122 of the processor 120. In some embodiments, the session configuration module 302 may be further configured to allocate, by the untrusted audio driver, one or more DMA engines 202, 204 of the audio controller 144 for the audio session. Each of the host DMA engines 202 is associated with a stream buffer 210 established in the memory 130. The session configuration module 302 may be further configured to assign, by the untrusted audio driver, the stream identifier to the DMA engines 202, 204, to program, by the untrusted audio driver, the stream identifier to the audio codec 146 associated with the audio session, and to send, by the untrusted audio driver, the stream identifier to the trusted software component after programming the stream identifier to the audio codec 146.

The endpoint verification module 304 is configured to determine, by the trusted software component, the audio codec 146 associated with the audio session based on a platform manifest 310 of the computing device 100. The platform manifest 310 may be securely provisioned to the computing device 100 by the manufacturer of the computing device 100, and includes mappings between pre-assigned channel identifiers and audio codecs 146 of the computing device 100. The endpoint verification module 304 is further configured to determine, by the trusted software component, whether the stream identifier received from the untrusted audio driver matches a stream identifier programmed to the audio codec 146 associated with the audio session, and to terminate, by the trusted software component, the audio session if the stream identifiers do not match.

The session protection module 306 is configured to determine, by the trusted software component, a DMA channel identifier associated with the audio codec 146 associated with the audio session based on the platform manifest 310 if the stream identifiers match. The session protection module 306 is further configured to securely send, by the trusted software component, the channel identifier to the audio controller 144 and to program, by the trusted software component, the cryptographic engine 136 with the channel identifier and an encryption key associated with the DMA channel. The session protection module 306 is further configured to start, by the audio controller 144, the audio session after the channel identifier is sent to the audio controller 144; and to perform, by the trusted software component, a cryptographic operation (e.g., decryption or encryption) on DMA audio data associated with the DMA channel.

The session protection module 306 may be further configured to program, by the audio controller 144, a host DMA engine 202 of the audio controller 144 associated with the audio session with a DMA channel identifier associated with the audio codec 146 associated with the audio session in response to the untrusted audio driver receiving a request to establish the audio session with the audio controller 144. Programming the channel identifier to the host DMA engine 202 may be independent from establishing the secure audio session. The session protection module 306 may be further configured to determine, by the audio controller 144, whether the channel identifier received from the trusted software component matches the channel identifier programmed in the host DMA engine 202 associated with the audio session and to terminate, by the audio controller 144, the audio session if the channel identifiers do not match. The session protection module 306 may be further configured to clear, by the trusted software component, the channel identifier from the cryptographic engine 136 if the audio session is terminated.

The topology protection module 308 is configured to send, by the trusted software component, a command to lock controller topology to the audio controller 144 prior to starting the secure audio session. The topology protection module 308 is further configured to lock, by the audio controller 144, the audio controller topology in response receiving the command to lock the controller topology. Locking the audio controller topology may include rejecting a routing change command directed at a codec 146 of the audio controller 144. The topology protection module 308 may be further configured to determine, by the trusted software component, whether to terminate the audio session and to send, by the trusted software component, a command to unlock the controller topology to the audio controller 144 if the audio session should be terminated. The topology protection module 308 may be further configured to unlock, by the audio controller 144, the controller topology in response receiving the command to unlock the controller topology.

Figure 4A:
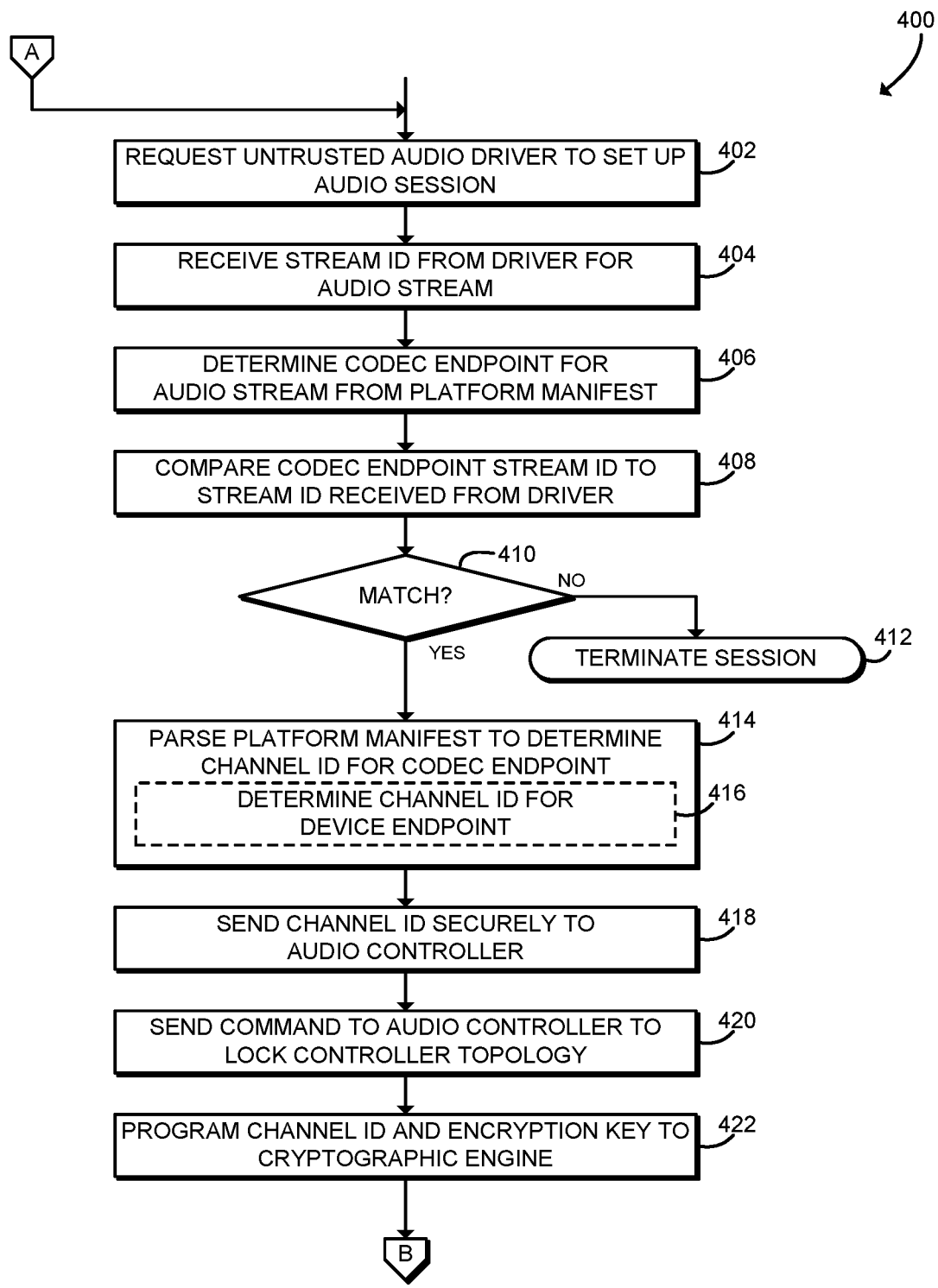
FIGS. 4A and 4B are a simplified flow diagram of at least one embodiment of a method for protecting I/O data that may be executed by the computing device of FIGS. 1-3.
Figure 4B:
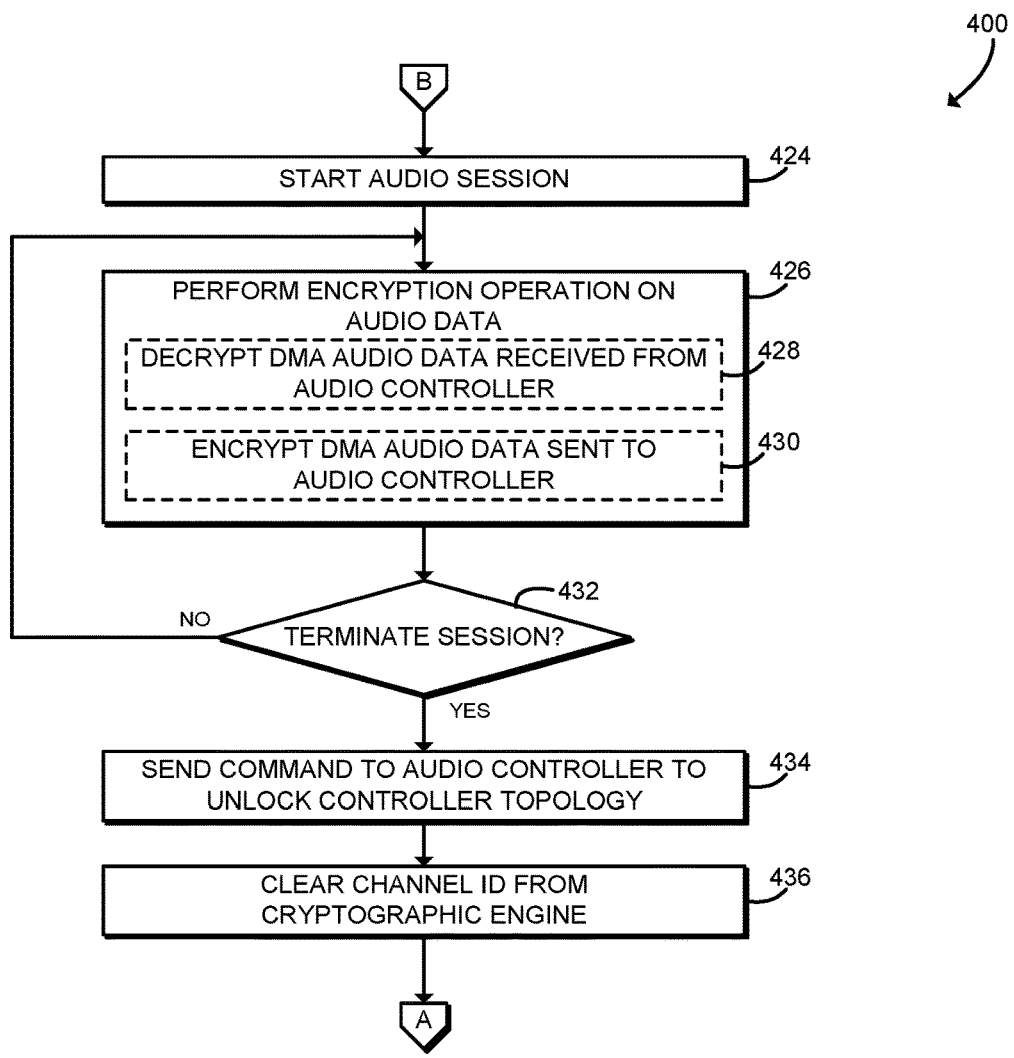

Referring now to FIGS. 4A and 4B, in use, the computing device 100 may execute a method 400 for protecting audio data with trusted I/O. The method 400 may be executed by a trusted software component of the computing device 100, such as a secure enclave established using the secure enclave support 122 of the processor 120. The method 400 begins with block 402, in which the trusted software component of the computing device 100 requests an untrusted audio driver to set up an audio session with the audio controller 144. The untrusted audio driver may be embodied as any kernel-level and/or user-level code executed by the computing device 100 and capable of configuring and otherwise managing the audio controller 144. The untrusted audio driver may set up the audio session by, for example, allocating one or more stream buffers 210, allocating one or more DMA engines 202, 204, and establishing a link between the link DMA engine 204 and the audio link 208 associated with a particular codec 146. For example, referring to FIG. 2, the trusted software component may request a microphone input audio session. In that example, the untrusted audio driver may allocate the stream buffer 210a, the host DMA engine 202a, and the link DMA engine 204a, and then configure the link layer 206 to connect the link DMA engine 204a with the HD audio link 208a and the analog codec 146a. One potential embodiment of a method for setting up the audio session is described further below in connection with FIG. 6.

In block 404, the trusted software component receives a stream identifier from the untrusted audio driver for the audio stream. The stream identifier is associated with the audio session and its associated audio pipeline between the stream buffer 210 and the audio codec 146. In block 406, the trusted software component determines a codec 146 endpoint for the audio stream based on the platform manifest 310. The trusted software component may parse the platform manifest 310 to identify the particular codec 146 that should be used for the requested audio session. For example, referring again to FIG. 2, for a microphone input audio session the trusted software component may identify the analog codec 146a, for a display audio output session the trusted software component may identify the display codec 146c, and so on.

In block 408, the trusted software component compares a stream identifier received from the codec 146 determined using the platform manifest 310 to the stream identifier received from the untrusted audio driver. The trusted software component may use any technique to retrieve the stream identifier from the codec 146. For example, the trusted software component may write one or more commands to the CORB 216, issue one or more port I/O commands, issue one or more memory mapped I/O commands, or perform other any other appropriate commands to query the codec 146 for the stream identifier. In block 410, the trusted software component determines whether the stream identifier received from the codec 146 matches the stream identifier received from the untrusted audio driver. If the stream identifiers do not match, then the audio session has been misconfigured. For example, the untrusted audio driver may be attempting to hijack the audio session, for example by attempting to receive input audio data from a codec 146 and/or audio device 148 that is not expected by the trusted software component. If the stream identifiers do not match, the method 400 branches to block 412, in which the trusted software component terminates the audio session. The computing device 100 may perform any appropriate response to termination of the audio session, including logging the error, notifying a user, or otherwise indicating that the audio session setup has failed. After terminating the audio session, the method 400 is completed. Referring back to block 410, if the stream identifiers match, the method 400 advances to block 414.

In block 414, the trusted software component parses the platform manifest 310 to determine a DMA channel identifier for the codec 146 endpoint associated with the audio session. As described below, the channel identifier may be used by the trusted software component and the cryptographic engine 136 to cryptographically protect audio I/O data transmitted to and/or received from the audio controller 144. The platform manifest 310 may include mappings between pre-assigned channel identifiers and audio codecs 146 of the computing device 100. The mappings may be predetermined by the manufacturer of the computing device 100, and the platform manifest 310 may be securely provisioned to the computing device 100 during manufacture. In some embodiments, in block 416, the trusted software component may parse the platform manifest to determine a channel identifier for an audio device 148 endpoint, rather than a codec 146. For example, referring again to FIG. 2, the platform manifest 310 may identify a channel identifier for each of the speaker output and the microphone input (as well as any other I/O jacks) connected to the analog codec 146a.

Figure 5:
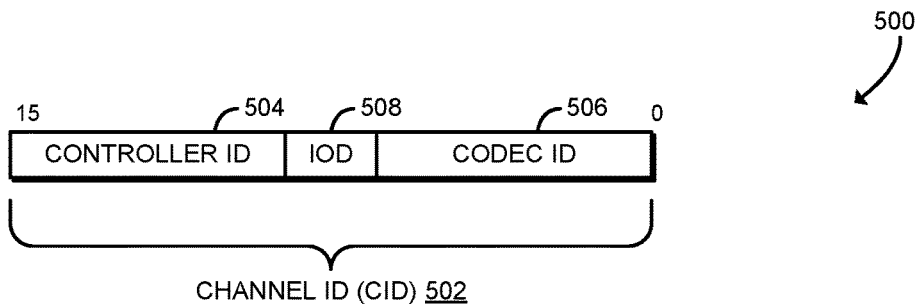
FIG. 5 is a schematic diagram illustrating at least one embodiment of a channel identifier that may be processed by the computing device of FIGS. 1-3.

Referring now to FIG. 5, diagram 500 illustrates one potential embodiment of a channel identifier 502. The channel identifier 502 uniquely identifies the I/O controller 140 and the DMA channel of the device 142 associated with a DMA transaction. The illustrative channel identifier 502 is a 16-bit value that includes a controller identifier field 504 that uniquely identifies the audio controller 144 and a codec identifier field 506 that identifies the codec 146. The channel identifier 502 also includes an I/O data field 508, which may be embodied as a bit indicating whether the DMA payload is metadata or audio data. The field lengths of the fields 502, 506, 508 may be platform-specific. In certain embodiments, the channel identifier 502 may be included in a DMA transaction header, for example as a TLP prefix used on PCIe compatible computing devices 100. Although the illustrative channel identifier 502 uses the codec identifier 506 to distinguish audio streams, in some embodiments the channel identifier may also include a device identifier used to identify a particular audio device 148 connected to the codec 146.

Referring back to FIG. 4A, in block 418 the trusted software component sends the channel identifier securely to the audio controller 144. The trusted software component may use any technique to securely communicate with the audio controller 144. For example, the trusted software component may send an encrypted or otherwise protected command to the audio controller 144 using one or more port I/O commands, using memory-mapped I/O commands, or through a dedicated interface. As described further below in connection with FIG. 7, the audio controller 144 will include or otherwise assert the channel identifier with all DMA transactions associated with the audio session.

In block 420, the trusted software component sends a command to the audio controller 144 to lock the controller topology of the audio controller 144. Locking the controller topology prevents routing changes between the DMA engines 202, 204, the codecs 146, and/or the audio devices 148. For example, referring again to FIG. 2, as described above, a microphone audio input session may link the stream buffer 210a, the host DMA engine 202a, the link DMA engine 204a, the HD audio link 208a, and the analog codec 146. A malicious attacker may attempt to modify that audio session to receive input data from another source, such as a Bluetooth microphone. Thus, the malicious attacker may attempt to reroute the audio session to connect the link DMA engine 204a to the I2S/PCM link 212c and the Bluetooth codec 146d. Locking the controller topology may prevent such changes to the audio session routing. One potential embodiment of a method for locking the controller topology is described further below in connection with FIG. 7.

In block 422, the trusted software component programs the channel identifier and an encryption key to the cryptographic engine 136. After being programmed, the cryptographic engine 136 intercepts DMA transactions tagged with the channel identifier and then encrypts and/or decrypts the DMA data using the encryption key. Thus, the cryptographic engine 136 protects the audio data in transit between the trusted software component and the audio controller 144. The trusted software component may program the cryptographic engine 136 by constructing a binary data structure that includes channel programming information (e.g., the channel identifier and the encryption key) and then executing a specialized processor instruction to wrap the programming information. For example, in some embodiments the trusted software component may execute an EBIND and/or EBINDTIO instruction of the processor 120. The wrapped programming information may include an encrypted version of the encryption key, which may only be decrypted by an unwrapping engine of the computing device 100 (such as the processor 120 and/or the cryptographic engine 136). Untrusted software of the computing device 100 (e.g., an operating system driver) may execute another specialized processor instruction with the wrapped programming information to unwrap the programming information and program the cryptographic engine 136. For example, in some embodiments the operating system driver may execute an UNWRAP instruction of the processor 120. After programming the cryptographic engine 136, the cryptographic engine 136 is prepared to protect audio I/O data associated with the audio controller 144.

In block 424, shown in FIG. 4B, the computing device 100 starts the audio session. The audio controller 144 starts the DMA engines 202, 204 associated with the audio session, which begin issuing DMA transactions to copy data from the associated stream buffer 210 (for audio output) or to copy data to the associated stream buffer 210 (for audio input). The host DMA engine 202 associated with the audio session includes or otherwise asserts the channel identifier with each DMA transaction. For example, the host DMA engine 202 may include the channel identifier in a transaction header of each DMA transaction, such as a TLP header. The cryptographic engine 136 encrypts input audio data before it is written to the stream buffer 210 and/or decrypts output audio data after it is read from the stream buffer 210. Thus, after starting the audio session, protected input and/or output audio data flows between the memory 130 and the audio controller 144.

In block 426, while the audio session is active, the trusted software component performs encryption operations on the audio data. The trusted software component performs the encryption operation using the encryption key programmed to the cryptographic engine 136. In some embodiments, in block 428 the trusted software component may decrypt input DMA audio data stored in the stream buffer 210 and received from the audio controller 144. The decrypted audio data may be processed by the trusted software component or may be provided to another entity of the computing device 100 such as a user-level software application. In some embodiments, in block 430, the trusted software component may encrypt output DMA audio data that is to be sent to the audio controller 144, prior to storing the encrypted audio data in the stream buffer 210.

In block 432, the computing device 100 determines whether to terminate the audio session. The audio session may be terminated, for example, when a user-level audio application is terminated, when a user stops audio playback or recording, or for any other appropriate reason. If the computing device 100 determines not to terminate the audio session, the method 400 loops back to block 426, in which the protected audio data continues to flow between the audio controller 144 and the trusted software component. If the computing device 100 determines to terminate the audio session, the method 400 advances to block 434.

In block 434, the trusted software component sends a command to the audio controller 144 to unlock the controller topology. After unlocking the controller topology, the routing between DMA engines 202, 204 and the codecs 146 may be modified, allowing additional audio sessions to be set up. In block 436, the trusted software component clears the channel identifier for the audio session from the cryptographic engine 136. After clearing the channel identifier, audio data associated with the codec 146 of the audio session may no longer be protected. Because the audio data is unprotected, the codec 146 may also be re-used for further audio sessions. After clearing the channel identifier, the method 400 loops back to block 402, shown in FIG. 4A, in which the computing device 100 may establish additional protected audio sessions.

Figure 6:
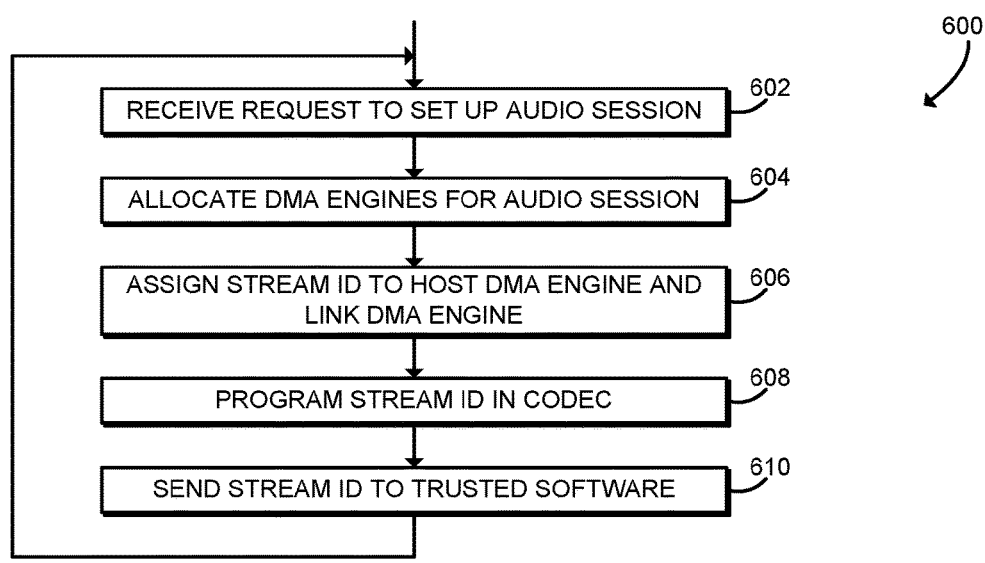
FIG. 6 is a simplified flow diagram of at least one embodiment of a method for setting up an audio session that may be executed by the computing device of FIGS. 1-3.

Referring now to FIG. 6, in use, the computing device 100 may execute a method 600 for setting up an audio session. The method 600 may be executed by an untrusted software component of the computing device 100, such as an untrusted audio driver. The method 600 begins with block 602, in which the untrusted audio driver receives a request to set up an audio session from a trusted software component. The request to set up the audio session may be generated by the trusted software component as described above in connection with block 402 of FIG. 4A.

In block 604, the computing device 100 allocates DMA engines 202, 204 for the audio session. The computing device 100 may select an available pair of DMA engines 202, 204 that are not currently being used for another audio stream. In some embodiments, the computing device 100 may also allocate a stream buffer 210 in the memory 130 and configure the allocated host DMA engine 202 to use the allocated stream buffer 210.

In block 606, the computing device 100 assigns a stream identifier to the allocated host DMA engine 202 and the allocated link DMA engine 204. The stream identifier may be used to identify a particular audio stream associated with one or more audio stream buffers 210. The stream identifier may be generated or otherwise managed by the untrusted audio driver of the computing device 100.

In block 608, the computing device 100 programs the stream identifier into the codec 146 to be used for the audio stream. After programming the stream identifier into the codec 146, an audio pipeline between the stream buffer 210, the DMA engines 202, 204, the audio link 208, and the codec 146 has been established. As described further below in connection with FIG. 7, the audio controller 144 may intercept the command to program the stream identifier to the codec 146 and in response program the appropriate channel identifier for the codec 146 into the host DMA engine 202.

In block 610, the computing device 100 sends the stream identifier to the trusted software component that requested the audio session. As described above in connection with FIG. 4, the trusted software component may ensure that the stream identifier returned by the untrusted driver software matches the stream identifier programmed in the codec 146. After returning the stream identifier, the method 600 loops back to block 602, in which the computing device 100 may receive another request to set up an audio session.

Figure 7:
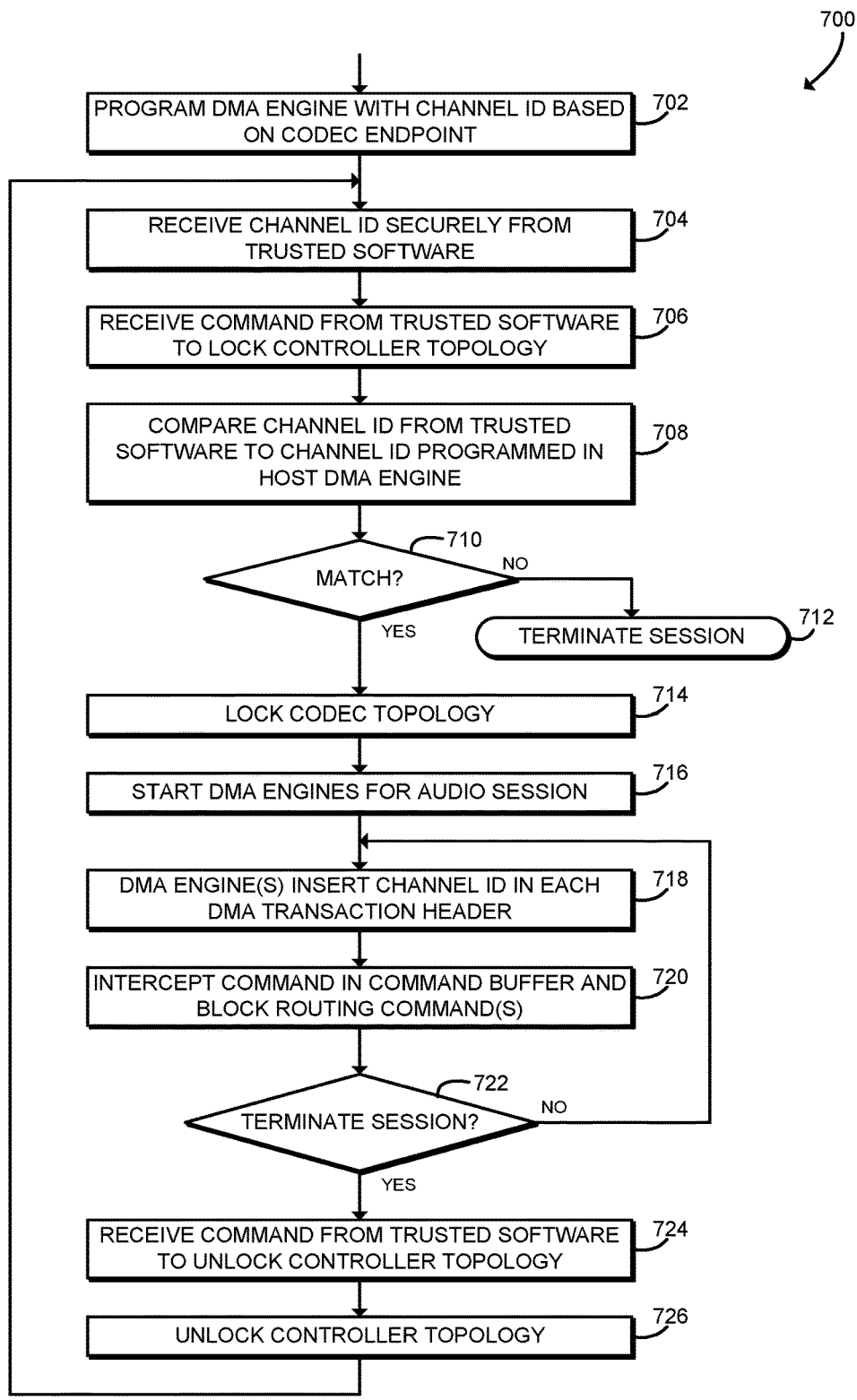
FIG. 7 is a simplified flow diagram of at least one embodiment of a method for protecting I/O data that may be executed by an audio controller of the computing device of FIGS. 1-3.

Referring now to FIG. 7, in use, the computing device 100 may execute a method 700 for protecting an audio I/O session. The method 700 may be executed by hardware, firmware, or other resources of the audio controller 144. The method 700 begins with block 702, in which the audio controller 144 programs a host DMA engine 202 with a DMA channel identifier determined based on an associated codec 146 endpoint. The audio controller 144 may intercept a command to program a stream identifier to the codec 146, as described above in connection with block 608 of FIG. 6. In response to the command to program the stream identifier to the codec 146, the audio controller 144 may program the DMA channel identifier associated with the codec 146 into the host DMA engine 202 for the associated audio session. Thus, programming the host DMA engine 202 with the channel identifier is performed independently from the trusted software component. The audio controller 144 may determine the channel identifier based on a codec identifier associated with the codec 146, which may be hard-coded to the codec 146 and/or the audio controller 144.

In block 704, the audio controller 144 securely receives a channel identifier for an audio session from the trusted software component. As described above in connection with block 418 of FIG. 4A, the channel identifier may be communicated from the trusted software component using any appropriate secure communication technique. In block 706, the audio controller 144 receives a command from the trusted software component to lock the controller topology. Although illustrated as being received in separate operations, it should be understood that in some embodiments, the command to lock the controller topology may be combined with the channel identifier received from the trusted software component.

In block 708, the audio controller 144 compares the channel identifier received from the trusted software component to the channel identifier programmed in the host DMA engine 202 associated with the audio session. If the channel identifiers do not match, then the audio controller 144 may be misconfigured. In block 710, the audio controller 144 determines whether the channel identifiers match. If not, the method 700 branches to block 712, in which the audio controller 144 terminates the audio session. The audio controller 144 may use any technique to terminate the audio session, including preventing further audio data transfer to or from the audio controller 144. The audio controller 144 may also notify the trusted software component that the audio session has been and/or should be terminated. After terminating the audio session, the method 700 is completed. Referring back to block 710, if the channel identifiers match, the method 700 advances to block 714.

In block 714, the audio controller 144 locks the controller topology. As described above, locking the controller topology prevents routing changes between the DMA engines 202, 204, the audio links 208, the codecs 146, and/or the audio devices 148. In particular, locking the controller topology may prevent a malicious audio driver from changing the routing of an audio session to a different codec 146 and/or audio device 148. The audio controller 144 may lock the controller topology by preventing certain routing commands received by the audio controller 144 from being provided to the audio codecs 146.

In block 716, the audio controller 144 starts the DMA engines 202, 204 for the audio session. After being started, the DMA engines 202, 204 issue DMA transactions to copy data from the associated stream buffer 210 to the audio controller 144 (for audio output) or to copy data to the associated stream buffer 210 from the audio controller 144 (for audio input).

In block 718, the host DMA engine 202 associated with the audio session includes or otherwise asserts the channel identifier with each DMA transaction. For example, the host DMA engine 202 may include the channel identifier in a transaction header, such as a TLP header. As described above, the cryptographic engine 136 encrypts input audio data before it is written to the stream buffer 210 and/or decrypts output audio data after it is read from the stream buffer 210.

In block 720, the audio controller 144 may intercept one or more commands from the command output ring buffer (CORB) 216 and block potentially insecure routing commands from reaching the audio codecs 146. The audio controller 144 may, for example, intercept commands from the CORB 216 to the CORB DMA engine 212 and block routing commands. The audio controller 144 may allow the CORB DMA engine 212 to transfer certain commands that do not modify controller topology to the codecs 146, such as volume control commands Thus, the audio controller 144 locks the controller topology while the secure audio session is active.

In block 722, the audio controller 144 determines whether to terminate the audio session. The audio controller 144 may use any technique to determine whether to terminate the audio session. For example, the audio controller 144 may terminate the audio session in response to a command received from the trusted software component and/or an untrusted audio driver. If the audio controller 144 determines not to terminate the audio session, the method 700 loops back to block 718, in which the protected audio data continues to flow and the controller topology remains locked. If the audio controller 144 determines to terminate the audio session, the method 700 advances to block 724.

In block 724, the audio controller 144 receives a command from the trusted software component to unlock the controller topology. The command to unlock the controller topology may be combined with or otherwise received with a command to terminate the audio session. In block 726, after receiving the command, the audio controller 144 unlocks the controller topology. Unlocking the topology allows the untrusted audio driver and other entities to modify the routing of the audio controller 144, including the assignment of DMA engines 202, 204 to audio codecs 146. The audio controller 144 may use any appropriate technique to unlock the controller topology. For example, the audio controller 144 may stop intercepting or otherwise allow routing commands from the CORB 216 to reach the codecs 146. After unlocking the controller topology, the method 700 loops back to block 704, in which the audio controller 144 may enable additional protected audio sessions.

It should be appreciated that, in some embodiments, the methods 400, 600, and/or 700, may be embodied as various instructions stored on a computer-readable media, which may be executed by the processor 120, the cryptographic engine 136, the audio controller 144, and/or other components of the computing device 100 to cause the computing device 100 to perform the corresponding method 400, 600, and/or 700. The computer-readable media may be embodied as any type of media capable of being read by the computing device 100 including, but not limited to, the memory 130, the data storage device 132, firmware devices, and/or other media.

EXAMPLES

Illustrative examples of the technologies disclosed herein are provided below. An embodiment of the technologies may include any one or more, and any combination of, the examples described below.

Example 1 includes a computing device for protected audio I/O, the computing device comprising: a session configuration module to (i) request, by a trusted software component of the computing device, an untrusted audio driver of the computing device to establish an audio session with an audio controller, wherein the audio session is associated with an audio codec of the audio controller, and (ii) receive, by the trusted software component, a stream identifier associated with the audio session from the untrusted audio driver; and an endpoint verification module to (i) determine, by the trusted software component, the audio codec associated with the audio session based on a platform manifest of the computing device, (ii) determine, by the trusted software component, whether the stream identifier received from the untrusted audio driver matches a stream identifier programmed to the audio codec associated with the audio session, and (iii) terminate, by the trusted software component, the audio session in response to a determination that the stream identifier received from the untrusted audio driver does not match the stream identifier programmed to the audio codec associated with the audio session.

Example 2 includes the subject matter of Example 1, and wherein the trusted software component comprises a secure enclave established with secure enclave support of a processor of the computing device.

Example 3 includes the subject matter of any of Examples 1 and 2, and further comprising a session protection module to: determine, by the trusted software component, a direct memory access (DMA) channel identifier associated with the audio codec associated with the audio session based on the platform manifest in response to a determination that the stream identifier received from the untrusted audio driver matches the stream identifier programmed to the audio codec; securely send, by the trusted software component, the channel identifier to the audio controller; program, by the trusted software component, a cryptographic engine of the computing device with the channel identifier and an encryption key associated with the DMA channel; start, by the audio controller, the audio session in response to sending of the channel identifier to the audio controller; and perform, by the trusted software component, a cryptographic operation on DMA audio data associated with the DMA channel in response to starting of the audio session.

Example 4 includes the subject matter of any of Examples 1-3, and wherein the session protection module is further to: program, by the audio controller, a host DMA engine of the audio controller associated with the audio session with a DMA channel identifier associated with the audio codec associated with the audio session in response to a request to the untrusted audio driver to establish the audio session with the audio controller; determine, by the audio controller, whether the channel identifier received from the trusted software component matches the channel identifier programmed in the host DMA engine associated with the audio session in response to the sending of the channel identifier to the audio controller; and terminate, by the audio controller, the audio session in response to a determination that the channel identifier received from the trusted software component does not match the channel identifier programmed in the host DMA engine associated with the audio session.

Example 5 includes the subject matter of any of Examples 1-4, and wherein to start the audio session in response to the sending of the channel identifier to the audio controller comprises to: start, by the audio controller, the host DMA engine associated with the audio session; and insert, by the host DMA engine associated with the audio session, the channel identifier in each DMA transaction header of the audio session.

Example 6 includes the subject matter of any of Examples 1-5, and wherein the session protection module is further to clear, by the trusted software component, the channel identifier from the cryptographic engine in response to a determination to terminate the audio session.

Example 7 includes the subject matter of any of Examples 1-6, and wherein to perform the cryptographic operation on the DMA audio data comprises to decrypt DMA audio data with the encryption key, wherein the DMA audio data is generated by the audio controller.

Example 8 includes the subject matter of any of Examples 1-7, and wherein to perform the cryptographic operation on the DMA audio data comprises to encrypt DMA audio data with the encryption key, wherein the DMA audio data to read by the audio controller.

Example 9 includes the subject matter of any of Examples 1-8, and wherein to determine the DMA channel identifier associated with the audio codec comprises to determine a DMA channel identifier associated with an audio device coupled to the audio codec based on the platform manifest.

Example 10 includes the subject matter of any of Examples 1-9, and wherein the audio device comprises an audio input device or an audio output device.

Example 11 includes the subject matter of any of Examples 1-10, and further comprising a topology protection module to: send, by the trusted software component, a command to lock controller topology to the audio controller in response to a determination that the stream identifier received from the untrusted audio driver matches the stream identifier programmed to the audio codec associated with the audio session; and lock, by the audio controller, the audio controller topology in response to sending of the command to lock the controller topology.

Example 12 includes the subject matter of any of Examples 1-11, and wherein to lock the audio controller topology comprises to reject a routing change command directed at a codec of the audio controller.

Example 13 includes the subject matter of any of Examples 1-12, and wherein to reject the routing change command comprises to intercept the routing change command from a command output ring buffer established in a memory of the computing device.

Example 14 includes the subject matter of any of Examples 1-13, and wherein the topology protection module is further to: determine, by the trusted software component, whether to terminate the audio session in response to locking of the audio controller topology; send, by the trusted software component, a command to unlock the controller topology to the audio controller in response to a determination to terminate the audio session; and unlock, by the audio controller, the controller topology in response to sending of the command to unlock the controller topology.

Example 15 includes the subject matter of any of Examples 1-14, and wherein the session configuration module is further to allocate, by the untrusted audio driver, one or more direct memory access (DMA) engines of the audio controller for the audio session in response to a request to the untrusted audio driver to establish the audio session, wherein the one or more DMA engines comprise one or more host DMA engines, wherein each host DMA engine is associated with a stream buffer established in a memory of the computing device.

Example 16 includes the subject matter of any of Examples 1-15, and wherein the session configuration module is further to: assign, by the untrusted audio driver, the stream identifier to the one or more DMA engines in response to allocation of the one or more DMA engines; program, by the untrusted audio driver, the stream identifier to the audio codec associated with the audio session; and send, by the untrusted audio driver, the stream identifier to the trusted software component in response to programming of the stream identifier to the audio codec.

Example 17 includes a method for protected audio I/O, the method comprising: requesting, by a trusted software component of a computing device, an untrusted audio driver of the computing device to establish an audio session with an audio controller, wherein the audio session is associated with an audio codec of the audio controller; receiving, by the trusted software component, a stream identifier associated with the audio session from the untrusted audio driver; determining, by the trusted software component, the audio codec associated with the audio session based on a platform manifest of the computing device; determining, by the trusted software component, whether the stream identifier received from the untrusted audio driver matches a stream identifier programmed to the audio codec associated with the audio session; and terminating, by the trusted software component, the audio session in response to determining that the stream identifier received from the untrusted audio driver does not match the stream identifier programmed to the audio codec associated with the audio session.

Example 18 includes the subject matter of Example 17, and wherein the trusted software component comprises a secure enclave established using secure enclave support of a processor of the computing device.

Example 19 includes the subject matter of any of Examples 17 and 18, and further comprising: determining, by the trusted software component, a direct memory access (DMA) channel identifier associated with the audio codec associated with the audio session based on the platform manifest in response to determining that the stream identifier received from the untrusted audio driver matches the stream identifier programmed to the audio codec; securely sending, by the trusted software component, the channel identifier to the audio controller; programming, by the trusted software component, a cryptographic engine of the computing device with the channel identifier and an encryption key associated with the DMA channel; starting, by the audio controller, the audio session in response to sending the channel identifier to the audio controller; and performing, by the trusted software component, a cryptographic operation on DMA audio data associated with the DMA channel in response to starting the audio session.

Example 20 includes the subject matter of any of Examples 17-19, and further comprising: programming, by the audio controller, a host DMA engine of the audio controller associated with the audio session with a DMA channel identifier associated with the audio codec associated with the audio session in response to requesting the untrusted audio driver to establish the audio session with the audio controller; determining, by the audio controller, whether the channel identifier received from the trusted software component matches the channel identifier programmed in the host DMA engine associated with the audio session in response to securely sending the channel identifier to the audio controller; and terminating, by the audio controller, the audio session in response to determining that the channel identifier received from the trusted software component does not match the channel identifier programmed in the host DMA engine associated with the audio session.

Example 21 includes the subject matter of any of Examples 17-20, and wherein starting the audio session in response to sending the channel identifier to the audio controller comprises: starting, by the audio controller, the host DMA engine associated with the audio session; and inserting, by the host DMA engine associated with the audio session, the channel identifier in each DMA transaction header of the audio session.

Example 22 includes the subject matter of any of Examples 17-21, and further comprising clearing, by the trusted software component, the channel identifier from the cryptographic engine in response to determining to terminate the audio session.

Example 23 includes the subject matter of any of Examples 17-22, and wherein performing the cryptographic operation on the DMA audio data comprises decrypting DMA audio data using the encryption key, wherein the DMA audio data is generated by the audio controller.

Example 24 includes the subject matter of any of Examples 17-23, and wherein performing the cryptographic operation on the DMA audio data comprises encrypting DMA audio data using the encryption key, wherein the DMA audio data to read by the audio controller.

Example 25 includes the subject matter of any of Examples 17-24, and wherein determining the DMA channel identifier associated with the audio codec comprises determining a DMA channel identifier associated with an audio device coupled to the audio codec based on the platform manifest.

Example 26 includes the subject matter of any of Examples 17-25, and wherein the audio device comprises an audio input device or an audio output device.

Example 27 includes the subject matter of any of Examples 17-26, and further comprising: sending, by the trusted software component, a command to lock controller topology to the audio controller in response to determining that the stream identifier received from the untrusted audio driver matches the stream identifier programmed to the audio codec associated with the audio session; and locking, by the audio controller, the audio controller topology in response to sending the command to lock the controller topology.

Example 28 includes the subject matter of any of Examples 17-27, and wherein locking the audio controller topology comprises rejecting a routing change command directed at a codec of the audio controller.

Example 29 includes the subject matter of any of Examples 17-28, and wherein rejecting the routing change command comprises intercepting the routing change command from a command output ring buffer established in a memory of the computing device.

Example 30 includes the subject matter of any of Examples 17-29, and further comprising: determining, by the trusted software component, whether to terminate the audio session in response to locking the audio controller topology; sending, by the trusted software component, a command to unlock the controller topology to the audio controller in response to determining to terminate the audio session; and unlocking, by the audio controller, the controller topology in response to sending the command to unlock the controller topology.

Example 31 includes the subject matter of any of Examples 17-30, and further comprising allocating, by the untrusted audio driver, one or more direct memory access (DMA) engines of the audio controller for the audio session in response to requesting the untrusted audio driver to establish the audio session, wherein the one or more DMA engines comprise one or more host DMA engines, wherein each host DMA engine is associated with a stream buffer established in a memory of the computing device.

Example 32 includes the subject matter of any of Examples 17-31, and further comprising: assigning, by the untrusted audio driver, the stream identifier to the one or more DMA engines in response to allocating the one or more DMA engines; programming, by the untrusted audio driver, the stream identifier to the audio codec associated with the audio session; and sending, by the untrusted audio driver, the stream identifier to the trusted software component in response to programming the stream identifier to the audio codec.

Example 33 includes a computing device comprising: a processor; and a memory having stored therein a plurality of instructions that when executed by the processor cause the computing device to perform the method of any of Examples 17-32.

Example 34 includes one or more machine readable storage media comprising a plurality of instructions stored thereon that in response to being executed result in a computing device performing the method of any of Examples 17-32.

Example 35 includes a computing device comprising means for performing the method of any of Examples 17-32.

Example 36 includes a computing device for protected audio I/O, the computing device comprising: means for requesting, by a trusted software component of the computing device, an untrusted audio driver of the computing device to establish an audio session with an audio controller, wherein the audio session is associated with an audio codec of the audio controller; means for receiving, by the trusted software component, a stream identifier associated with the audio session from the untrusted audio driver; means for determining, by the trusted software component, the audio codec associated with the audio session based on a platform manifest of the computing device; means for determining, by the trusted software component, whether the stream identifier received from the untrusted audio driver matches a stream identifier programmed to the audio codec associated with the audio session; and means for terminating, by the trusted software component, the audio session in response to determining that the stream identifier received from the untrusted audio driver does not match the stream identifier programmed to the audio codec associated with the audio session.

Example 37 includes the subject matter of Example 36, and wherein the trusted software component comprises a secure enclave established using secure enclave support of a processor of the computing device.

Example 38 includes the subject matter of any of Examples 36 and 37, and further comprising: means for determining, by the trusted software component, a direct memory access (DMA) channel identifier associated with the audio codec associated with the audio session based on the platform manifest in response to determining that the stream identifier received from the untrusted audio driver matches the stream identifier programmed to the audio codec; means for securely sending, by the trusted software component, the channel identifier to the audio controller; means for programming, by the trusted software component, a cryptographic engine of the computing device with the channel identifier and an encryption key associated with the DMA channel; means for starting, by the audio controller, the audio session in response to sending the channel identifier to the audio controller; and means for performing, by the trusted software component, a cryptographic operation on DMA audio data associated with the DMA channel in response to starting the audio session.

Example 39 includes the subject matter of any of Examples 36-38, and further comprising: means for programming, by the audio controller, a host DMA engine of the audio controller associated with the audio session with a DMA channel identifier associated with the audio codec associated with the audio session in response to requesting the untrusted audio driver to establish the audio session with the audio controller; means for determining, by the audio controller, whether the channel identifier received from the trusted software component matches the channel identifier programmed in the host DMA engine associated with the audio session in response to securely sending the channel identifier to the audio controller; and means for terminating, by the audio controller, the audio session in response to determining that the channel identifier received from the trusted software component does not match the channel identifier programmed in the host DMA engine associated with the audio session.

Example 40 includes the subject matter of any of Examples 36-39, and wherein the means for starting the audio session in response to sending the channel identifier to the audio controller comprises: means for starting, by the audio controller, the host DMA engine associated with the audio session; and means for inserting, by the host DMA engine associated with the audio session, the channel identifier in each DMA transaction header of the audio session.

Example 41 includes the subject matter of any of Examples 36-40, and further comprising means for clearing, by the trusted software component, the channel identifier from the cryptographic engine in response to determining to terminate the audio session.

Example 42 includes the subject matter of any of Examples 36-41, and wherein the means for performing the cryptographic operation on the DMA audio data comprises means for decrypting DMA audio data using the encryption key, wherein the DMA audio data is generated by the audio controller.

Example 43 includes the subject matter of any of Examples 36-42, and wherein the means for performing the cryptographic operation on the DMA audio data comprises means for encrypting DMA audio data using the encryption key, wherein the DMA audio data to read by the audio controller.

Example 44 includes the subject matter of any of Examples 36-43, and wherein the means for determining the DMA channel identifier associated with the audio codec comprises means for determining a DMA channel identifier associated with an audio device coupled to the audio codec based on the platform manifest.

Example 45 includes the subject matter of any of Examples 36-44, and wherein the audio device comprises an audio input device or an audio output device.

Example 46 includes the subject matter of any of Examples 36-45, and further comprising: means for sending, by the trusted software component, a command to lock controller topology to the audio controller in response to determining that the stream identifier received from the untrusted audio driver matches the stream identifier programmed to the audio codec associated with the audio session; and means for locking, by the audio controller, the audio controller topology in response to sending the command to lock the controller topology.

Example 47 includes the subject matter of any of Examples 36-46, and wherein the means for locking the audio controller topology comprises means for rejecting a routing change command directed at a codec of the audio controller.

Example 48 includes the subject matter of any of Examples 36-47, and wherein the means for rejecting the routing change command comprises means for intercepting the routing change command from a command output ring buffer established in a memory of the computing device.

Example 49 includes the subject matter of any of Examples 36-48, and further comprising: means for determining, by the trusted software component, whether to terminate the audio session in response to locking the audio controller topology; means for sending, by the trusted software component, a command to unlock the controller topology to the audio controller in response to determining to terminate the audio session; and means for unlocking, by the audio controller, the controller topology in response to sending the command to unlock the controller topology.

Example 50 includes the subject matter of any of Examples 36-49, and further comprising means for allocating, by the untrusted audio driver, one or more direct memory access (DMA) engines of the audio controller for the audio session in response to requesting the untrusted audio driver to establish the audio session, wherein the one or more DMA engines comprise one or more host DMA engines, wherein each host DMA engine is associated with a stream buffer established in a memory of the computing device.

Example 51 includes the subject matter of any of Examples 36-50, and further comprising: means for assigning, by the untrusted audio driver, the stream identifier to the one or more DMA engines in response to allocating the one or more DMA engines; means for programming, by the untrusted audio driver, the stream identifier to the audio codec associated with the audio session; and means for sending, by the untrusted audio driver, the stream identifier to the trusted software component in response to programming the stream identifier to the audio codec.

The invention claimed is:

1. A computing device for protected audio I/O, the computing device comprising:
   an audio controller that includes an audio codec, wherein the audio controller comprises a host controller of the computing device, and wherein the audio codec includes a hardware audio resource to connect to an audio device;
   a session configuration module to (i) request, by a trusted execution environment of the computing device, an audio driver of the computing device to establish an audio session with the audio controller, wherein the audio session is associated with the audio codec of the audio controller, and (ii) receive, by the trusted execution environment, a stream identifier associated with the audio session from the audio driver; and
   an endpoint verification module to (i) determine, by the trusted execution environment, the audio codec associated with the audio session based on a platform manifest of the computing device, wherein the platform manifest is securely provisioned to the computing device and wherein the platform manifest includes one or more predetermined mappings between direct memory access (DMA) channel identifiers and audio codecs, (ii) query, by the trusted execution environment, the audio codec for a stream identifier programmed to the audio codec associated with the audio session in response to a determination of the audio codec, (iii) determine, by the trusted execution environment, whether the stream identifier received from the audio driver matches the stream identifier programmed to the audio codec associated with the audio session, and (iv) terminate, by the trusted execution environment, the audio session in response to a determination that the stream identifier received from the audio driver does not match the stream identifier programmed to the audio codec associated with the audio session.

2. The computing device of claim 1, wherein the trusted execution environment comprises a secure enclave established with secure enclave support of a processor of the computing device.

3. The computing device of claim 1, further comprising a session protection module to:
   determine, by the trusted execution environment, a channel identifier associated with the audio codec associated with the audio session based on the platform manifest in response to a determination that the stream identifier received from the audio driver matches the stream identifier programmed to the audio codec;
   securely send, by the trusted execution environment, the channel identifier to the audio controller;
   program, by the trusted execution environment, a cryptographic engine of the computing device with the channel identifier and an encryption key associated with the DMA channel;
   start, by the audio controller, the audio session in response to sending of the channel identifier to the audio controller; and
   perform, by the trusted execution environment, a cryptographic operation on DMA audio data associated with the DMA channel in response to starting of the audio session.

4. The computing device of claim 3, wherein the session protection module is further to:
   program, by the audio controller, a host DMA engine of the audio controller associated with the audio session with a DMA channel identifier associated with the audio codec associated with the audio session in response to a request to the audio driver to establish the audio session with the audio controller;
   determine, by the audio controller, whether the channel identifier received from the trusted execution environment matches the channel identifier programmed in the host DMA engine associated with the audio session in response to the sending of the channel identifier to the audio controller; and
   terminate, by the audio controller, the audio session in response to a determination that the channel identifier received from the trusted execution environment does not match the channel identifier programmed in the host DMA engine associated with the audio session.

5. The computing device of claim 4, wherein to start the audio session in response to the sending of the channel identifier to the audio controller comprises to:
   start, by the audio controller, the host DMA engine associated with the audio session; and
   insert, by the host DMA engine associated with the audio session, the channel identifier in each DMA transaction header of the audio session.

6. The computing device of claim 3, wherein to perform the cryptographic operation on the DMA audio data comprises to decrypt DMA audio data with the encryption key, wherein the DMA audio data is generated by the audio controller.

7. The computing device of claim 3, wherein to perform the cryptographic operation on the DMA audio data comprises to encrypt DMA audio data with the encryption key, wherein the DMA audio data to read by the audio controller.

8. The computing device of claim 3, wherein to determine the DMA channel identifier associated with the audio codec comprises to determine a DMA channel identifier associated with an audio device coupled to the audio codec based on the platform manifest.

9. A method for protected audio I/O, the method comprising:
   requesting, by a trusted execution environment of a computing device, an audio driver of the computing device to establish an audio session with an audio controller, wherein the audio session is associated with an audio codec of the audio controller, wherein the audio controller comprises a host controller of the computing device, and wherein the audio codec includes a hardware audio resource to connect to an audio device;
   receiving, by the trusted execution environment, a stream identifier associated with the audio session from the audio driver;
   determining, by the trusted execution environment, the audio codec associated with the audio session based on a platform manifest of the computing device, wherein the platform manifest is securely provisioned to the computing device;

querying, by the trusted execution environment, the audio codec for a stream identifier programmed to the audio codec associated with the audio session in response to determining the audio codec;

determining, by the trusted execution environment, whether the stream identifier received from the audio driver matches the stream identifier programmed to the audio codec associated with the audio session; and terminating, by the trusted execution environment, the audio session in response to determining that the stream identifier received from the audio driver does not match the stream identifier programmed to the audio codec associated with the audio session.

10. The method of claim 9, wherein the trusted execution environment comprises a secure enclave established using secure enclave support of a processor of the computing device.

11. The method of claim 9, further comprising:

determining, by the trusted execution environment, a direct memory access (DMA) channel identifier associated with the audio codec associated with the audio session based on the platform manifest in response to determining that the stream identifier received from the audio driver matches the stream identifier programmed to the audio codec;

securely sending, by the trusted execution environment, the channel identifier to the audio controller;

programming, by the trusted execution environment, a cryptographic engine of the computing device with the channel identifier and an encryption key associated with the DMA channel;

starting, by the audio controller, the audio session in response to sending the channel identifier to the audio controller; and performing, by the trusted execution environment, a cryptographic operation on DMA audio data associated with the DMA channel in response to starting the audio session.

12. The method of claim 11, further comprising:

programming, by the audio controller, a host DMA engine of the audio controller associated with the audio session with a DMA channel identifier associated with the audio codec associated with the audio session in response to requesting the audio driver to establish the audio session with the audio controller;

determining, by the audio controller, whether the channel identifier received from the trusted execution environment matches the channel identifier programmed in the host DMA engine associated with the audio session in response to securely sending the channel identifier to the audio controller; and terminating, by the audio controller, the audio session in response to determining that the channel identifier received from the trusted execution environment does not match the channel identifier programmed in the host DMA engine associated with the audio session.

13. The method of claim 11, wherein determining the DMA channel identifier associated with the audio codec comprises determining a DMA channel identifier associated with an audio device coupled to the audio codec based on the platform manifest.

14. One or more non-transitory, machine readable storage media comprising a plurality of instructions that in response to being executed cause a computing device to:

request, by a trusted execution environment of the computing device, an audio driver of the computing device to establish an audio session with an audio controller, wherein the audio session is associated with an audio codec of the audio controller, wherein the audio controller comprises a host controller of the computing device, and wherein the audio codec includes a hardware audio resource to connect to an audio device;

receive, by the trusted execution environment, a stream identifier associated with the audio session from the audio driver;

determine, by the trusted execution environment, the audio codec associated with the audio session based on a platform manifest of the computing device, wherein the platform manifest is securely provisioned to the computing device;

query, by the trusted execution environment, the audio codec for a stream identifier programmed to the audio codec associated with the audio session in response to determining the audio codec;

determine, by the trusted execution environment, whether the stream identifier received from the audio driver matches the stream identifier programmed to the audio codec associated with the audio session; and terminate, by the trusted execution environment, the audio session in response to determining that the stream identifier received from the audio driver does not match the stream identifier programmed to the audio codec associated with the audio session.

15. The one or more non-transitory, machine readable storage media of claim 14, wherein the trusted execution environment comprises a secure enclave established using secure enclave support of a processor of the computing device.

16. The one or more non-transitory, machine readable storage media of claim 14, further comprising a plurality of instructions that in response to being executed cause the computing device to:

determine, by the trusted execution environment, a direct memory access (DMA) channel identifier associated with the audio codec associated with the audio session based on the platform manifest in response to determining that the stream identifier received from the audio driver matches the stream identifier programmed to the audio codec;

securely send, by the trusted execution environment, the channel identifier to the audio controller;

program, by the trusted execution environment, a cryptographic engine of the computing device with the channel identifier and an encryption key associated with the DMA channel;

start, by the audio controller, the audio session in response to sending the channel identifier to the audio controller; and perform, by the trusted execution environment, a cryptographic operation on DMA audio data associated with the DMA channel in response to starting the audio session.

17. The one or more non-transitory, machine readable storage media of claim 16, further comprising a plurality of instructions that in response to being executed cause the computing device to:

program, by the audio controller, a host DMA engine of the audio controller associated with the audio session with a DMA channel identifier associated with the audio codec associated with the audio session in response to requesting the audio driver to establish the audio session with the audio controller;

determine, by the audio controller, whether the channel identifier received from the trusted execution environment matches the channel identifier programmed in the host DMA engine associated with the audio session in response to securely sending the channel identifier to the audio controller; and terminate, by the audio controller, the audio session in response to determining that the channel identifier received from the trusted execution environment does not match the channel identifier programmed in the host DMA engine associated with the audio session.

18. The one or more non-transitory, machine readable storage media of claim 16, wherein to determine the DMA channel identifier associated with the audio codec comprises to determine a DMA channel identifier associated with an audio device coupled to the audio codec based on the platform manifest.

* * * * *